Figure 1:
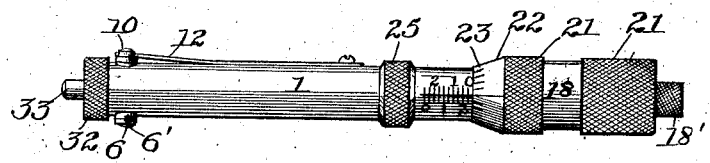

No. 846,607. PATENTED MAR. 12, 1907.
J. L. PEDDYCOART.
MICROMETER GAGE.
APPLICATION FILED FEB. 28, 1906.

Witnesses:
O. W. Kemmel
A. S. Phillips

Inventor:
John L. Peddycoart
by Clarence K. Chamberlain
Atty

UNITED STATES PATENT OFFICE.

JOHN L. PEDDYCOART, OF EAST WATERLOO, IOWA.

MICROMETER-GAGE.

No. 846,607.   Specification of Letters Patent.   Patented March 12, 1907.

Application filed February 28, 1906. Serial No. 303,543.

*To all whom it may concern:*

Be it known that I, JOHN L. PEDDYCOART, a citizen of the United States, residing at East Waterloo, in the county of Blackhawk and State of Iowa, have invented a new and useful Improvement in Micrometer-Gages, of which the following is a specification.

My invention relates to instruments of precision; and the object thereof is to provide a means of measuring the distances between interior points within an inclosed opening.

The range of measurement which has heretofore been provided by internal calipers and gages has been very limited. By the device which I have invented the range of measure may extend from a very small to an extremely large one, all of which can be measured with the greatest accuracy by means of the micrometer forming a part thereof.

The principles of my invention are illustrated in the drawings, in which—

Figure 2:
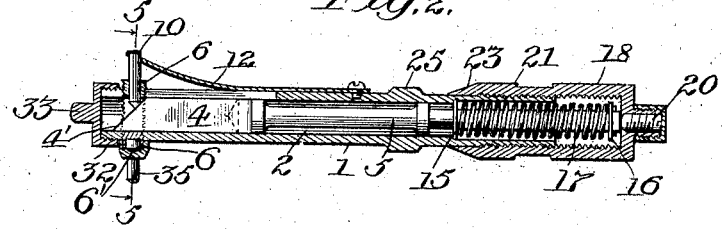
Figure 3:
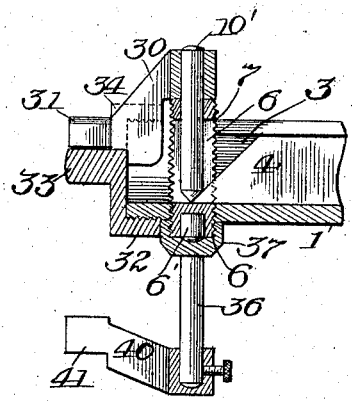
Figure 4:
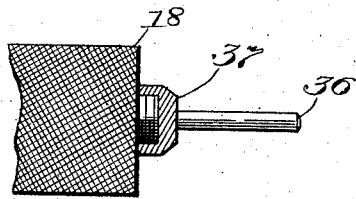
Figure 5:
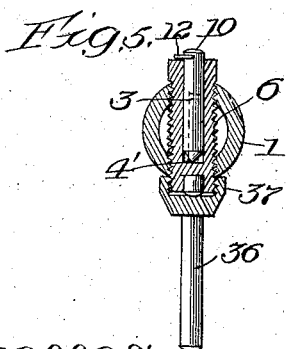
Figure 6:
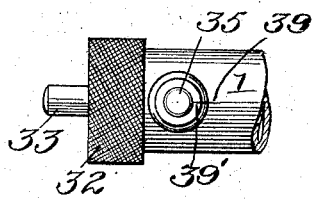

Figure 1 shows a side elevation of my device with the measuring-points at their least position of extension. Fig. 2 is a longitudinal section of the same, showing the measuring-pin extended, together with a certain supplemental part. Fig. 3 is an enlarged section of the measuring end of my device, also showing certain supplemental attachments. Fig. 4 is an enlarged view, partially in section, of the handle end of my device. Fig. 5 is a cross-section of Fig. 2, and Fig. 6 is an enlarged view of the under side of the measuring end of my apparatus.

Further describing my invention with reference to the drawings, in which like characters of reference denote like parts throughout, 1 is a barrel, preferably provided with a tubular portion 2 and a vertically-slotted portion 3. A plunger comprising a blade 4 and a shaft 5 is mounted within the said slotted and tubular portions of the barrel. In a transverse opening at one end of the barrel is screwed a bushing 6, having a slot 7 of such shape and dimensions as will correspond to those of the blade 4 and permit the same to pass therethrough in close and accurate contact. The said bushing is provided with a longitudinal aperture somewhat greater in diameter than the thickness of the blade and its corresponding slot. Into the said aperture is fitted a measuring-pin 10, whose lower extremity should be shaped to an angle corresponding to the slant 4' of the plunger-blade. A slight notch in the upper portion of the pin is adapted to take the spring 12, attached to the exterior of the barrel. It will be seen that the pin thus mounted is adapted to play freely and accurately back and forth within the bushing as the plunger-blade may be advanced or withdrawn, said pin being restored to position upon withdrawal of the blade by the pressure of the spring 12.

The movement of the plunger may be controlled as follows: A circular stop 15, through which the plunger passes, may be provided within the circular portion of the barrel. A similar stop 16 is keyed or otherwise secured to the plunger, and between the two stops is mounted the coiled spring 17. The exterior of the barrel is screw-threaded for a portion of its length, and fitted thereto is a correspondingly internally screw-threaded sleeve 18, into which the plunger projects beyond the end of the barrel. The end of such plunger rests upon the bottom of the sleeve, which may further be provided with an adjusting-screw 20 to provide an accurate original adjustment and also to take up the wear from use. The said sleeve is provided with knurled portions 21 and a slanting portion 22, upon the edge of which are placed graduation-marks 23. The graduated end of the sleeve should preferably be rebored, so as to form a smooth and accurate fit over the external portion of the barrel over which it is to play. Such portion toward the knurled part 25 is also provided with graduation-marks reading in both directions. The lower portion of the bushing 6 is provided with an anvil 6', whose end corresponds to the projecting end on the other side of the barrel of the measuring-pin 10.

It will be seen that by turning the sleeve in either direction the mechanism described causes the pin to be extended or withdrawn, thus giving distances which can be accurately measured and read on the upper scale and the graduations of the sleeve. It will be seen that the distances ordinarily measurable are those of the measuring-points, placed as shown in Fig. 1. In order that smaller distances may be measured, my instrument may be provided with a substitute pin 10', upon which may be mounted a bracket 30, having a nose 31. The same end of the barrel may be provided with a cap 32, having a projection 33. The said cap should be slotted at 34 in such a manner that the bracket may pass thereinto and be guided thereby. When this attachment is added, much smaller measurements can be made by expanding the parts to indicate the distance between the upper edge of the nose 31 and the opposite portion of the pin 33. On the other hand, it may be desired to make greater measurements than those which can be compassed by the action of the parts thus described. When this is desired, I provide a series of auxiliary anvils, spindles, or extension-pieces of different lengths, as may be indicated by 35 and 36. These may be attached to a socket 37, adapted to screw over the lower end of the bushing 6 and be seated against the lower part of the barrel 1. They should be made of the greatest accuracy and of standard lengths, which by being added to the known movement of the pin 10 will give true measurements. To facilitate the accurate adjustment of the same, the lower part of the barrel, as shown in Fig. 6, and the spindle-socket should be provided with corresponding marks 39 and 39', which when placed in alinement will determine the proper adjustment of the spindle.

A series of extension-anvils may be made to cover a great range of distances. When these distances reach the length of the instrument itself, they can be measured, using the body of the instrument as a standard. For this purpose the end of the projection 33 acts as an anvil, and the auxiliary spindles and sockets are placed on the sleeve 18 in place of the false cap 18'. Extensions of the instrument produced by unscrewing the sleeve will be read thereon in connection with the lower scale shown on the barrel of the instrument. In this manner variations of measurement beyond the fundamental structure of the instrument may be made. The extension-pins of standard lengths may be substituted for each other and their lengths be added to the reading on the movable scales, whether used longitudinally or transversely of the instrument itself.

The measurements thus far provided for are those of an internal tube or bore; but it is sometimes desired to measure the distance apart of small apertures, especially where a series of the same are to be placed in a faceplate at regular distances. That this may be done I provide an auxiliary bracket 40, having a nose 41, which is adapted to be fitted to and socketed over the end of any of the extension pieces or spindles 36. The use of these will be readily understood, as the cap 32 may be removed, if desired, allowing measurements to be taken covering the distance between the points 31 and 41.

I claim—

1. In a micrometer-gage, a barrel, a measuring-pin extensible transversely of the barrel, an anvil axially in line with the pin and in rigid relation to the barrel, means for extending the pin, and means for measuring the degree of extension thereof.

2. In a micrometer-gage, a barrel, a transverse bushing therein, an anvil on one side of the barrel rigidly related thereto, and a measuring-pin in the bushing axially extensible therein and in the line of said anvil.

3. In a micrometer-gage, a barrel, a measuring-pin placed transversely thereof, a screw-threaded part on the barrel in alinement with the measuring-pin, and an extension-piece to engage the screw-threaded part.

4. In a micrometer-gage, a barrel, a transverse bushing having a threaded portion external to the barrel, a measuring-pin extensibly mounted in the bushing, and an extension-piece adapted to screw on said bushing.

5. In a micrometer-gage, a barrel, a slotted bushing transverse thereto, a measuring-pin in the bushing, a plunger movable in the slot in said bushing and having a slanted end adapted to engage and actuate the measuring-pin.

6. In a micrometer-gage, a barrel, a measuring-pin extensible transversely of the barrel, a plunger in the barrel engaging said pin and in rigid relation to the barrel, means for moving the plunger, an anvil axially in line with the pin, and means connected therewith for measuring the degree of extension of the measuring-pin.

7. In a micrometer-gage, a barrel, a measuring-pin extensible transversely of the barrel, an anvil axially in line with the pin and in rigid relation to the barrel, a plunger in the barrel adapted to actuate the pin, a sleeve screw-threaded to the barrel adapted to engage the plunger and force it into engagement with the pin.

8. In a micrometer-gage, a barrel, a measuring-pin extensible transversely of the barrel, an anvil on the barrel axially in line with the pin and in rigid relation to the barrel, a plunger in the barrel adapted to actuate said pin, a sleeve screw-threaded to the barrel engaging the plunger, and a spring to retract the plunger.

9. In a micrometer-gage, a barrel, a slotted bushing transversely mounted therein, a pin in and alined with the bushing, a plunger in the barrel having a slanted end and guided by the bushing-slot, said slanted end bearing on the lower end of the pin, and a sleeve screw-threaded to the barrel to actuate the plunger.

10. In a micrometer-gage, a barrel, a slotted bushing transversely mounted therein, a pin in and alined with the bushing, a plunger in the barrel having a slanted end and guided by the bushing-slot, said slanted end bearing on the lower end of the pin, a sleeve screw-threaded to the barrel to actuate the plunger, and a spring to retract the plunger.

11. In a micrometer-gage, a barrel, a measuring-pin movable transversely thereto, means for measuring the degree of extension, an anvil on the side of the barrel opposite the measuring-pin, and an extension-piece adapted to be mounted on the barrel in alinement with the measuring-pin.

12. In a micrometer-gage, a barrel, a measuring-pin movable transversely thereto, a sleeve screw-threaded to the barrel, an anvil on the end of the barrel opposite to the sleeve, and an extension-piece adapted alternatively to be mounted on the barrel in alinement with the measuring-pin and on the sleeve in alinement with the anvil.

13. In a micrometer-gage, a barrel having a fixed measuring-point thereon, a pin extensible transversely to the barrel, a bracket on said pin, and means for gaging the extension of said bracket with reference to said fixed point.

14. In a micrometer-gage, a barrel, a measuring-pin movable transversely thereof, a bracket on said pin, an extension-piece on the barrel, a bracket thereon, and means for gaging the relative extension of said brackets.

In witness whereof I have hereunto set my hand, this 26th day of January, A. D. 1906, in the presence of two subscribing witnesses.

JOHN L. PEDDYCOART.

Witnesses:
 JOHN H. WEYHGANDT,
 FRED C. SIEGEL.